(12) United States Patent
Liu

(10) Patent No.: US 7,508,375 B2
(45) Date of Patent: Mar. 24, 2009

(54) METHOD FOR CONTROLLING A CONTROL OF A DISPLAY

(75) Inventor: Cheng-Chieh Liu, Zhongli (TW)

(73) Assignee: Qisda Corporation, Taoyuan County (TW)

( * ) Notice: Subject to any disclaimer, the term of this patent is extended or adjusted under 35 U.S.C. 154(b) by 604 days.

(21) Appl. No.: 11/079,760

(22) Filed: Mar. 14, 2005

(65) Prior Publication Data

US 2005/0200620 A1  Sep. 15, 2005

(30) Foreign Application Priority Data

Mar. 15, 2004  (TW) ............... 93106819 A

(51) Int. Cl.
*G09G 5/00* (2006.01)
(52) U.S. Cl. .................... 345/158; 345/156
(58) Field of Classification Search ......... 345/156–173, 345/204
See application file for complete search history.

(56) References Cited

U.S. PATENT DOCUMENTS

| 5,986,634 | A | * | 11/1999 | Alioshin et al. ............. 345/649 |
| 6,882,335 | B2 | * | 4/2005 | Saarinen ..................... 345/156 |
| 7,030,868 | B2 | * | 4/2006 | Clapper ..................... 345/204 |
| 7,071,916 | B2 | * | 7/2006 | Duarte et al. ............... 345/156 |
| 7,256,767 | B2 | * | 8/2007 | Wong et al. ................. 345/158 |
| 7,289,102 | B2 | * | 10/2007 | Hinckley et al. ............ 345/156 |
| 2001/0011993 | A1 | * | 8/2001 | Saarinen ..................... 345/156 |
| 2002/0140675 | A1 | * | 10/2002 | Ali et al. .................... 345/158 |

FOREIGN PATENT DOCUMENTS

CN  1514333  7/2004

OTHER PUBLICATIONS

China Office Action mailed Jul. 28, 2006.

* cited by examiner

*Primary Examiner*—Nitin Patel

(57) ABSTRACT

A method for controlling a control of a display comprising a control cluster. The display is placed in a first or a second orientation. The method first detects the orientation of the display. Next, the method assigns a function of the control according to the orientation. If the orientation is the first orientation, the control is enabled to execute a first function. If the orientation is the second orientation, the control is enabled to execute a second function.

8 Claims, 6 Drawing Sheets

METHOD FOR CONTROLLING A CONTROL OF A DISPLAY

BACKGROUND OF THE INVENTION

1. Field of the Invention

The present invention relates to electronic display technology, and in particular to a method for controlling a control of a display.

2. Description of the Related Art

Conventionally, a display provides controls at the bottom of a frame or bezel to execute adjustment and control of the display, such as "power on", "menu", "right", or "left". The shape and the arrangement of the controls can be various, for example, in a line or in a circle.

Presently, alternatives to conventional displays have been developed, such as a rotatable display. FIG. 1a and FIG. 1b show a rotatable display with a control cluster. A rotatable display 10 has a control cluster 20 on the bottom of a frame or bezel. The control cluster 20 includes controls 200, 202, 204, and 206, providing functions as "power on" 200, "menu" 202, "right" 204, and "left" 206. If the rotatable display 10 is rotated by 180°, the control cluster 20 changes its position to the top of bezel as shown in FIG. 2a and FIG. 2b, and relative positions of the control cluster 20 are changed accordingly.

With rotation of the display 10, users have to change operating method of the controls accordingly. For example, the original position of the control 200 is replaced by the control 204. Thus, users need to push the now-left sided control 204 to execute "right" function, causing inconvenience.

Therefore, a method for controlling a control of a display, especially for a rotatable display, is required.

SUMMARY OF THE INVENTION

Accordingly, an object of the invention is to enable function of the controls on a display in varying positions.

To achieve the foregoing and other objects, the invention provides a method for controlling a control of a display. The display is placed in a first or a second orientation. The first and the second orientations are separated by 180°.

First, a detector is provided in the display. The detector can be a tilt sensor. Next, the orientation of the display is detected by the detector. Function of the control is then assigned according to the orientation. If the orientation is the first orientation, the control is enabled to execute a first function. If the orientation is the second one, the control is enabled to execute an opposite second function.

Additionally, the invention discloses a machine-readable computer program providing a method controlling a control of a display, wherein the display can be placed in a first or a second orientation. The method comprises the previously mentioned steps.

Moreover, the present invention discloses a display. The display is deployable in a first or a second orientation separated by 180°. The inventive display comprises a first control, a detector, and a processing unit.

The detector detects the orientation of the display, and can be a tilt sensor. The processing unit is coupled to the detector and the first control. The processing unit assigns the function of the first control according to its orientation. The processing unit enables the first control to execute a first function when the display is in the first orientation and enables the first control to execute a second function when the display is in the second orientation. The processing unit can be implemented in a chip. The control can be an on-screen display (OSD) control.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

As summarized above, the present invention is directed to novel methods and devices for overcoming inconvenience in controlling conventional rotatable display. In one embodiment, the invention provides a method for controlling a control of a display. The display is placed in a first or a second orientation. The first and second orientations are separated by 180°.

Figure 1A:
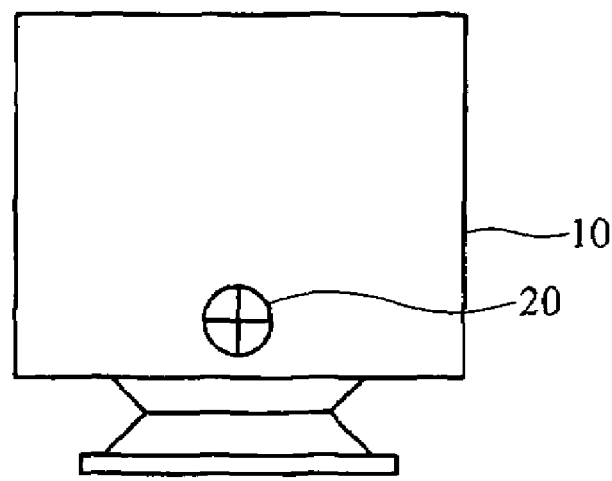
FIG. 1a and FIG. 1b are diagrams of a conventional rotatable display with a control cluster in a first orientation.
Figure 1B:
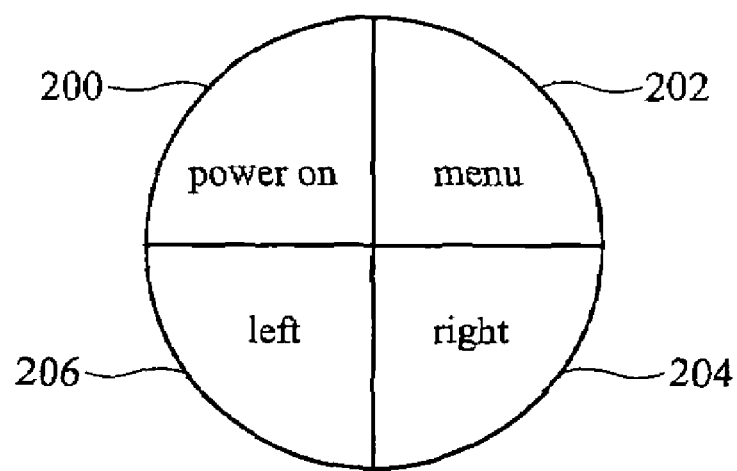
Figure 2A:
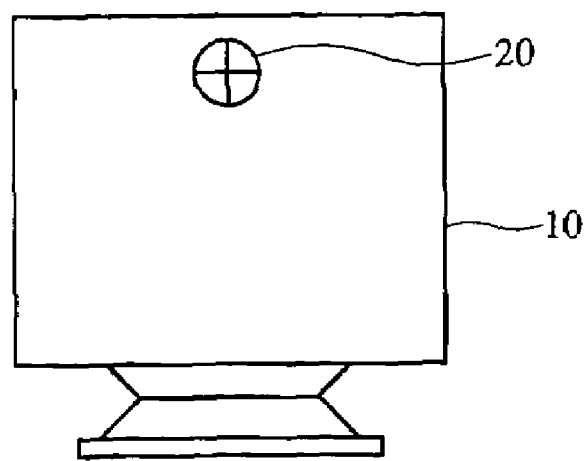
FIG. 2a and FIG. 2b are diagrams of the display in FIGS. 1a~1b in a second orientation.
Figure 2B:
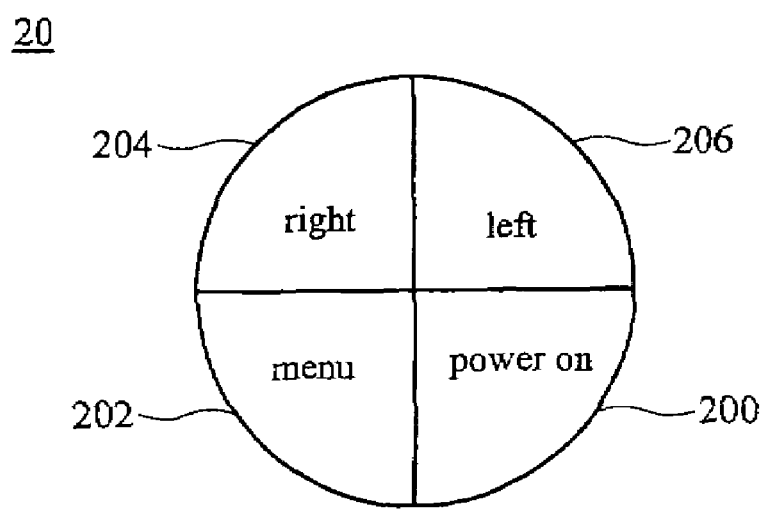
Figure 3:
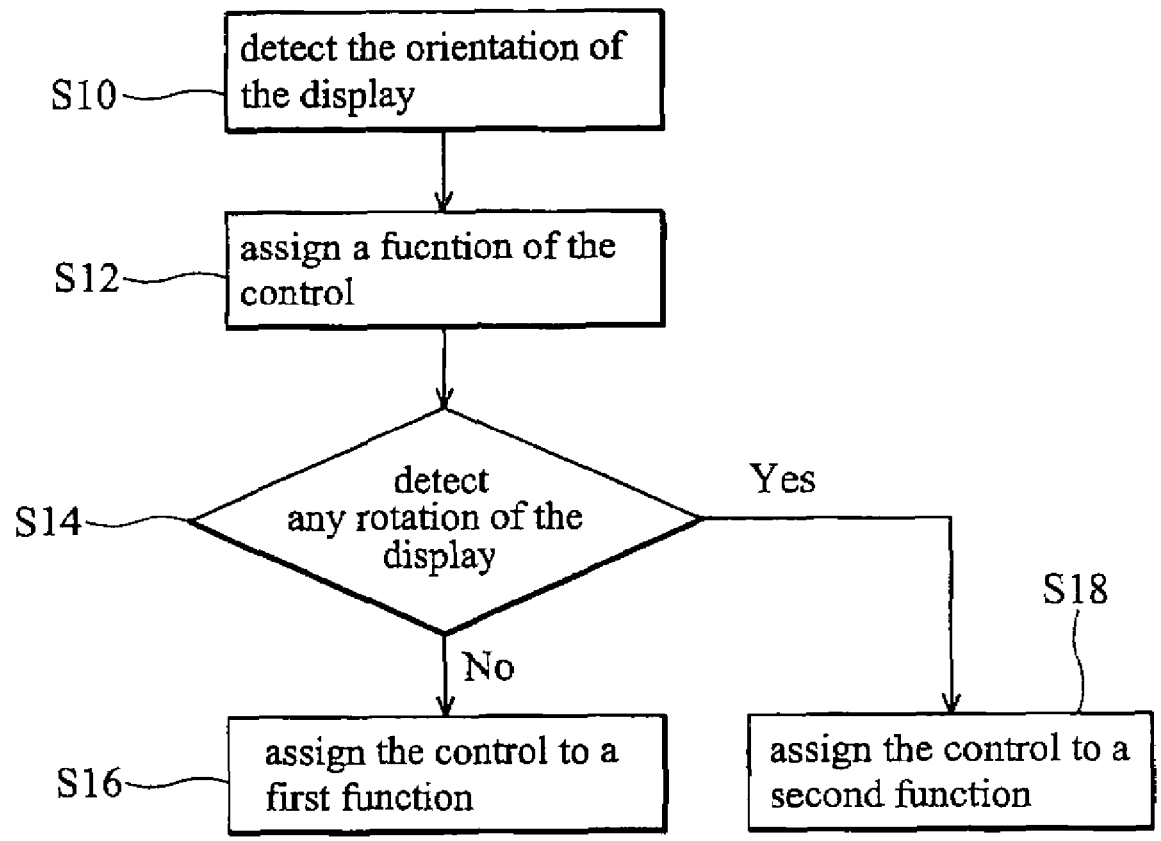
FIG. 3 is a flowchart of the method for controlling a control of a display.

FIG. 3 is a flowchart of the method for controlling a control of a display. First, the orientation of the display is detected (step s10). A function of the control is then assigned according to the orientation (step s12). Next, any rotation of the display is detected (step s14). If the orientation is the first orientation, the control is assigned to a first function (step s16). If the orientation is the second orientation, the control is assigned to a second function (step s18).

Figure 7:
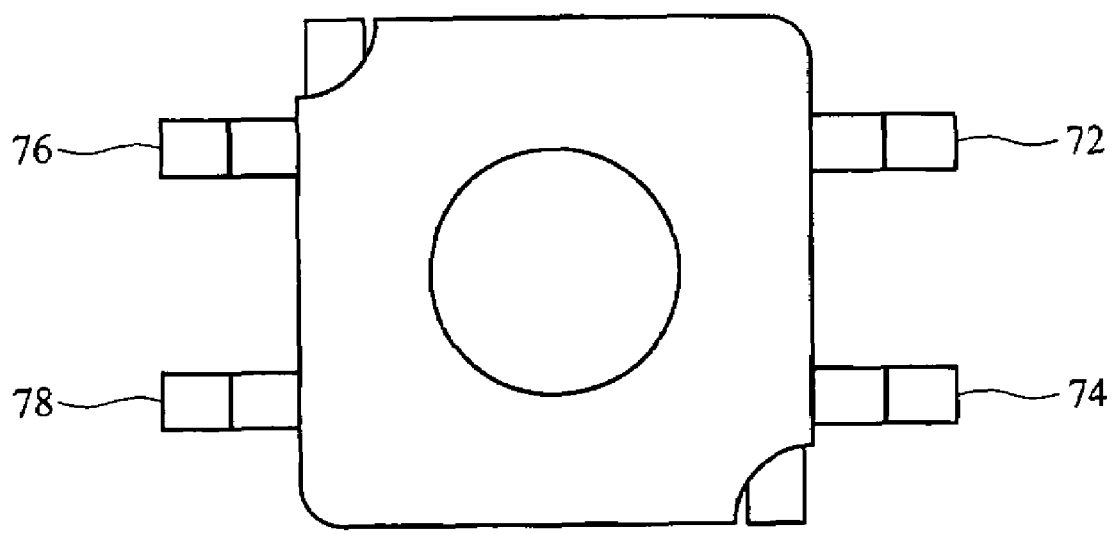
FIG. 7 is a diagram of the tilt sensor according to the present invention.

The orientation detection of the display, i.e. the step S10 is accomplished by the following steps. First, a detector is provided in the display, and can be a tilt sensor. Next, the orientation of the display is detected by the detector. FIG. 7 is a diagram of the tilt sensor according to the present invention. The tilt sensor 70 has four pins 72, 74, 76, and 78. The pins connect to a processing unit, such as a chip. When the pins detect that the orientation of the display has been changed, they transmit a potential difference to the processing unit. The processing unit then processes the received potential difference as a tilt status or a tilt angle for reference.

Figure 4:
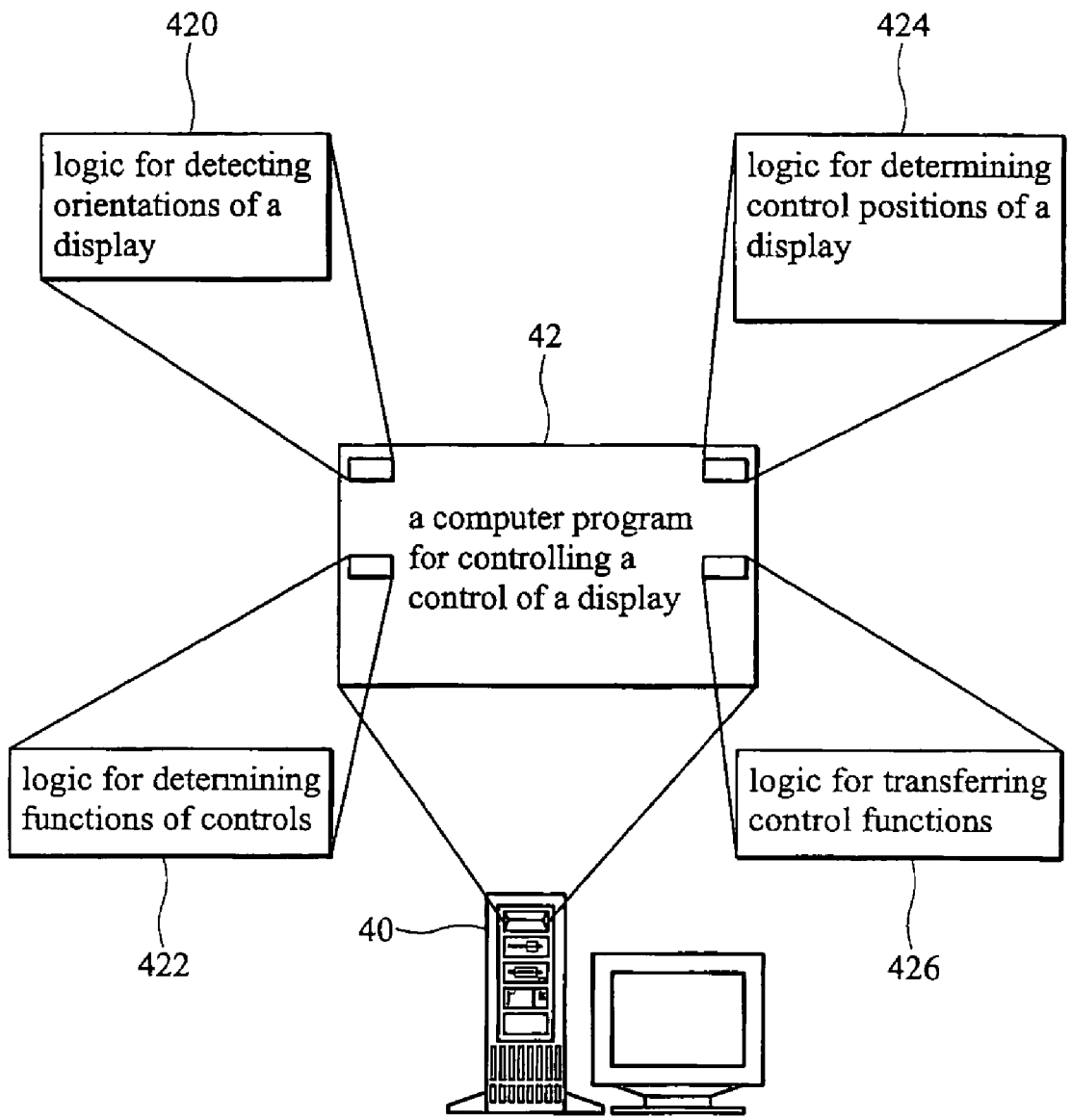
FIG. 4 is a diagram of a machine-readable computer program providing a method for controlling a control of a display.

FIG. 4 is a diagram of a machine-readable computer program providing a method for controlling a control of a display, mainly including logic for detecting orientations of a display 420, determining functions of controls according to the orientations 422, determining control positions of a display 424, and transferring control functions 426.

Figure 5:
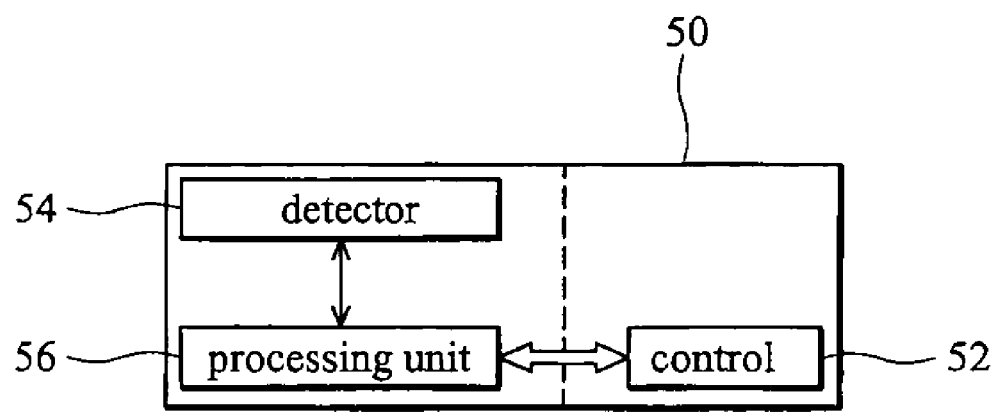
FIG. 5 is a diagram of one implementation of the display according to the present invention.

FIG. 5 is a diagram of one implementation of the display according to the present invention, in which a display 50 is disclosed, deployable in a first or a second orientation. The first and second orientations are separated by 180°. The inventive display 50 comprises a control 52, a detector 54, and a processing unit 56.

The detector 54 detects the orientation of the display 50. The detector 54 can be a tilt sensor. The processing unit 56 is coupled to the detector 54 and assigns a function of the control 52 according to the orientation. The processing unit 56 enables the control 52 to execute a first function if the orientation is the first orientation. The processing unit 56 enables the control 52 to execute a second function if the orientation is the second orientation. The processing unit 56 can be implemented in a chip. The control 52 can be an OSD control.

Figure 6:
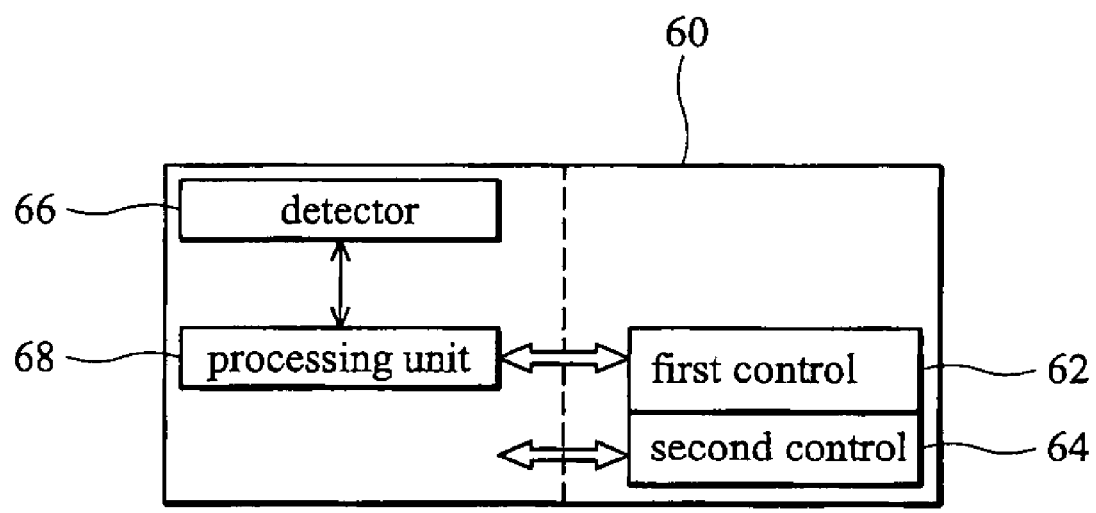
FIG. 6 is a diagram of another implementation of the display according to the present invention.

FIG. 6 is a diagram of another implementation of the display according to the present invention, in which a display 60 is provided, deployable in a first or a second orientation. The first and second orientations are separated by 180°. The provided display 60 comprises a first control 62, a second control 64, a detector 66, and a processing unit 68.

The detector 66 detects the orientation of the display 60. The processing unit 68 is coupled to the detector 66 and assigns functions of the controls 62, 64 according to the orientation. The processing unit 68 enables the first control 62 to execute a first function and the second control 64 to execute a second function if the orientation is the first orientation. The processing unit 68 enables the first control 62 to execute the second function and the second control 64 to execute the first function if the orientation is the second orientation. The detector 66 can be a tilt sensor. The first control 62 is opposite to the second control 64 and can be an OSD control.

As an example, the display 60 can comprise a first control 62 as an OSD control and a second control 64 as a power on control. Originally, the first control 62 is above the second control 64. If the display 60 is rotated from the first orientation to the second orientation, that is, rotated 180°, the positions of the first control 62 and the second control 64 are reversed.

The orientation of the display 60 is first detected by the detector 66. The detector 66 relays the detected orientation to the processing unit 68, which assigns control functions according to the new orientation, such that control 64 now performs OSD control function and control 62 power on function, maintaining the original operating positions.

As mentioned above, a detector is provided in the display to detect the orientation thereof. The detector is coupled to a processing unit, such as a micro control unit (MCU). The MCU stores programs for controlling the display.

Thus, a method for controlling a control of a display is provided. The inventive method can be implemented in a rotatable display for a portable electronic product, presenting significant advantages.

It will be appreciated from the foregoing description that the method and device described herein provides a dynamic and robust solution to display control problems. If, for example, the arrangement of controls or the type of the display is changed, the method and device of the present invention can be revised accordingly.

The method of the present invention, or certain aspects or portions thereof, may take the form of program code (i.e., instructions), wherein when the program code is executed by a machine, such as a computer, the machine becomes an apparatus for practicing the invention. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display which is placed in a first or a second orientation, comprising:
   a first user input interface;
   a detector, detecting whether the display is in the first or second orientation;
   a processing unit, coupled to the detector and the first user input interface, assigning a first or second function to the first user input interface according to the first or second orientation; and
   a second user input interface connected to the processing unit;
   wherein the first user input interface executes the first function when a user presses the first user input interface and the display is in the first orientation, and
   wherein the first user input interface executes the second function when the user presses the first user input interface and the display is in the second orientation, and
   wherein the second user input interface executes the second function when the user presses the second user input interface and the display is positioned in the first orientation, and
   wherein the second user input interface executes the first function when the user presses the second user input interface and the display is position in the second orientation, and
   wherein the first user input interface and the second user input interface are vertically aligned, the first user input interface is higher then the second user input interface when the display is positioned in the first orientation, the first user input interface is lower then the second user input interface when the display is positioned in the second orientation.

2. The display as claimed in claim 1, wherein the detector is a tilt sensor.

3. The display as claimed in claim 1, wherein the first and the second orientations are separated by an angle of 180°.

4. The display as claimed in claim 1, wherein the first user input interface is opposite to the second user input interface.

5. A display which is placed in a first or a second orientation, comprising:
   a first user input interface;
   a detector, detecting whether the display is in the first or second orientation;
   a processing unit, coupled to the detector and the first user input interface, assigning a first or second function to the first user input interface according to the first or second orientation; and
   a second user input interface connected to the processing unit;
   wherein the first user input interface executes the first function when a user presses the first user input interface and the display is in the first orientation, and
   wherein the first user input interface executes the second function when the user presses the first user input interface and the display is in the second orientation, and
   wherein the second user input interface executes the second function when the user presses the second user input interface and the display is positioned in the first orientation, and
   wherein the second user input interface executes the first function when the user presses the second user input interface and the display is positioned in the second orientation, and
   wherein the first user input interface and the second user input interface are horizontally aligned, the first user input interface is on a left side of the second user input interface when the display is positioned in the first orientation, the first user input interface is on a right side of the second user input interface when the display is positioned in the second orientation.

6. The display as claimed in claim 5, wherein the detector is a tilt sensor.

7. The display as claimed in claim 5, wherein the first and the second orientations are separated by an angle of 180 °.

8. The display as claimed in claim 5, wherein the first user input interface is opposite to the second user input interface.

* * * * *